(No Model.)
G. W. SMEAL.
STUMP EXTRACTOR.
No. 453,051. Patented May 26, 1891.
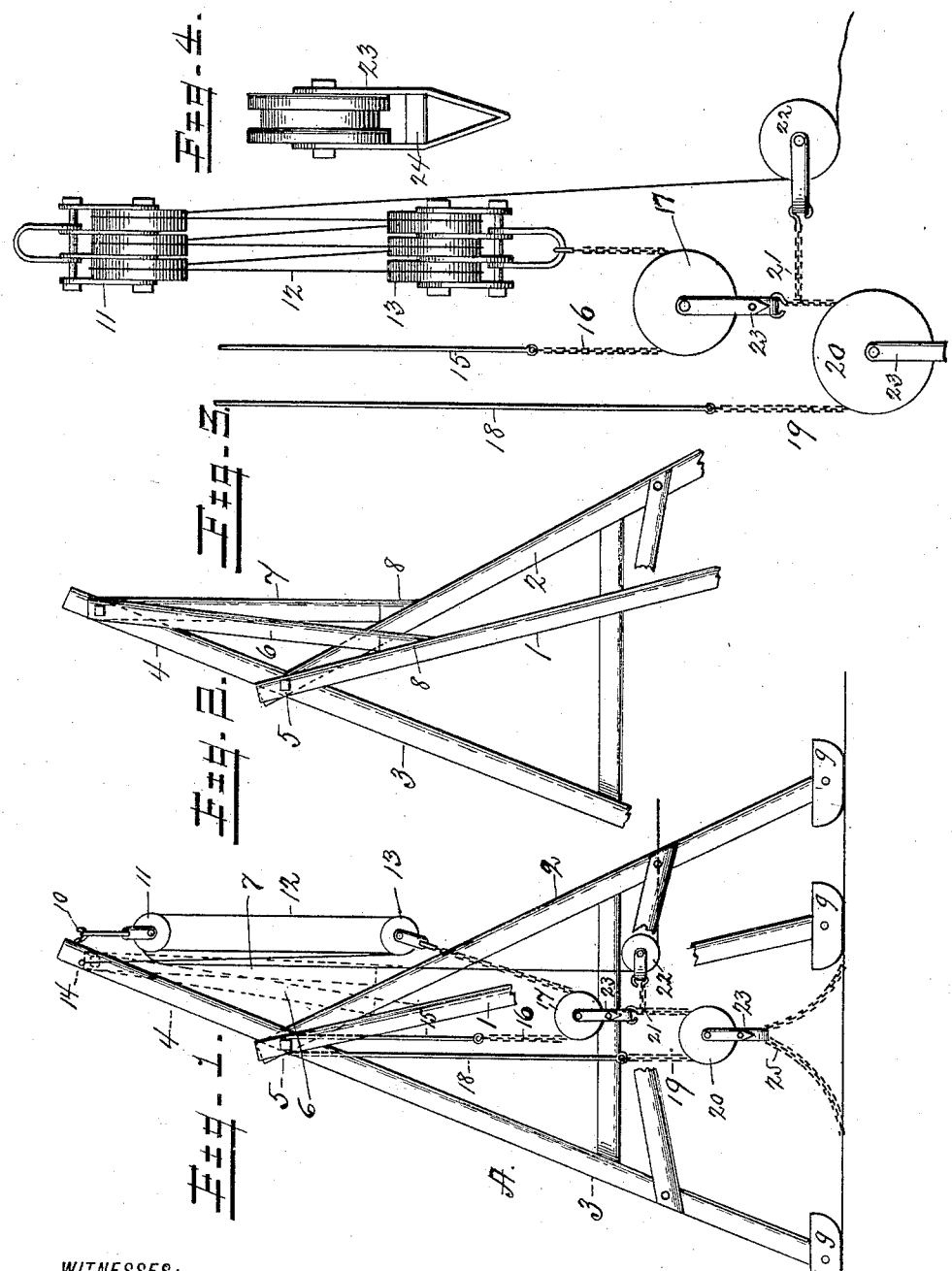
WITNESSES:
Albert B. Blackwood
Wm. H. Bates
INVENTOR
Geo. W. Smeal
BY
A. G. Heylman,
ATTORNEY.

UNITED STATES PATENT OFFICE.

GEORGE W. SMEAL, OF OSCEOLA MILLS, PENNSYLVANIA.

STUMP-EXTRACTOR.

SPECIFICATION forming part of Letters Patent No. 453,051, dated May 26, 1891.

Application filed March 9, 1891. Serial No. 384,323. (No model.)

*To all whom it may concern:*

Be it known that I, GEORGE W. SMEAL, a citizen of the United States of America, residing at Osceola Mills, in the county of Clearfield and State of Pennsylvania, have invented a new and useful Stump-Puller, of which the following is a specification.

My invention relates to improvements in stump pullers or extractors of that class employing block-and-tackle means for providing the power; and the object is to provide a simple, effective, reliable, and strong mechanism to attain the purpose.

My device, machine, or apparatus is applicable to all the purposes which a stump-puller is designed to fulfill, whether the stumps are large or small, but because of its portability and lightness it is well adapted for extracting small stumps quickly.

I have fully and clearly illustrated my invention in the accompanying drawings, wherein—

Figure 1 is a view in elevation of the complete device. Fig. 2 is a view showing the construction of the upper part of the tripod-frame. Fig. 3 is a detail of the block-and-tackle mechanism. Fig. 4 is a detail of the clevis for holding the single sheaves.

Referring to the drawings, A designates the frame which supports the lifting or extracting mechanism. This consists of three substantial supports 1, 2, and 3, joined together so as to form a tripod. The support 3 extends above the point of union with the other two supports and projects at an incline, as at 4, as shown in Figs. 1 and 2 of the drawings. The supports are secured together by a bolt 5, passed through the upper ends of the two supports, with the other between them. To strengthen and support the projecting end portion of the long support, brace-pieces 6 7 are fixed between the upper end thereof and the other supports, being bolted at the upper ends and their lower ends resting on blocks 8, fastened to the supports. These braces support the projecting end of the support 3 and prevent it from breakage when the operation of pulling stumps is in progress.

On the lower ends of each leg of the tripod is a runner or shoe 9, which enables the frame to be moved from place to place without being lifted.

On the end of the support 3 is fixed a hook 10, on which the standing-block of the tackle is suspended, consisting of a triple sheave 11, over which the rope or fall 12 is arranged, being passed about the running-block 13 below, substantially as shown. The standing end of the rope is fixed to a lug or pin 14 on the support 3 at the top and is carried down to the running-sheave and then run in triple lines to fill the blocks, the hauling end being led under a sheave, as shown and as hereinafter specified.

On the cross-bolt 5, which holds the apex of the tripod-frame together, is attached one end of a bar or rod 15, formed at its lower end with an eye, to which a chain 16 is connected and carried under a sheave 17, and thence upward and connected to the clevis of the running-sheave of the tackle. To the bolt 5 is also secured another rod 18, which carries a chain 19, connected to its lower end, which chain is carried under a sheave 20 and upward and has its end connected to the clevis of the sheave 17, as shown. To the chain 19, between the sheaves 17 and 20, is a short chain 21, to the free end of which is connected the hauling-sheave 22, under which the hauling end of the rope is passed and then attached to the power, which is usually a draft-animal.

The clevis 23 used on the sheaves 17 and 20 is of particular construction. The object is to prevent the arms of the clevis or bridle from pinching the sheave and thus retarding the power when the device is in operation of pulling the stumps. I therefore construct the bridle or clevis as follows: A band of iron is bent down on itself to form the bridle, and between these arms is lodged a cross-piece 24, held by the pinch of the arms of the clevis. The sheave-pin is then passed through the holes in the ends of the clevis and the device is in operative assemblage. The cross-pin prevents the arms from pinching the sheaves when the force is applied to them.

To the clevis of the sheave 20 is connected a chain 25, which is used to fasten to the stumps.

The operation is readily perceived from the foregoing description, but may be briefly stated as follows: The device being set up over a stump and the stump-chain fastened to the stump, the animal attached to the hauling end of the fall is started, and the result is the stump must be lifted by the upward movement of the sheaves.

Having thus described my invention, what I claim is—

1. In a stump-extractor, the combination of the tripod-frame having one of the legs of the tripod projected above the other two, a block and tackle suspended from the projecting part of the said leg, a suspended chain secured to the junction of the tripod and having its lower end secured to the running-block of the tackle, a sheave on the chain, a second chain suspended from the junction of the tripod and having its lower end secured to the sheave carried by the other chain, a sheave on the latter chain having a stump-chain connected thereto, and a hauling-sheave connected to the chain of the lower sheave between it and the upper sheave, substantially as described.

2. In a stump-extractor, the combination, with a supporting-frame, of a block and tackle suspended from the top of the frame, a rod suspended from the frame, a chain connected to the rod and having its other end connected to the bridle of the running-sheave, a sheave on the chain, a second rod suspended from the frame, a chain connected to the rod and having its other end connected to the bridle of the sheave on the other chain, a sheave on the latter chain having a stump-chain connected thereto, and a hauling-sheave connected to the chain of the lower sheave between it and the upper sheave, substantially as described.

3. The frame for a stump-extractor herein described, consisting of a tripod-frame having one of the legs projected above the other two, and braces fastened to the end of the projecting piece and having their lower ends resting on the other legs below their junction, substantially as specified.

In witness whereof I have hereto set my hand in the presence of two attesting witnesses.

GEO. W. SMEAL.

Attest:
  A. G. HEYLMUN,
  J. S. BARKER.